June 24, 1930.  C. R. SHORT  1,768,528
BEARING
Filed May 5, 1927

Inventor
Charles R. Short
By Spencer Hardman & Fehr.
his Attorneys

Patented June 24, 1930

1,768,528

UNITED STATES PATENT OFFICE

CHARLES R. SHORT, OF DETROIT, MICHIGAN, ASSIGNOR TO THE MORAINE PRODUCTS CORPORATION, OF DAYTON, OHIO, A CORPORATION OF OHIO

BEARING

Application filed May 5, 1927. Serial No. 188,929.

This invention relates to the manufacture of articles having surfaces adapted to be placed in rubbing contact with a relatively movable part such as a bearing for a shaft or a guide for a reciprocating part.

One object of the present invention is to provide a bearing, guide or similar part comprising a contact portion of relatively porous metal capable of containing a lubricant and a portion of metal of relatively high mechanical strength.

Briefly, this object is accomplished by forming a relatively thin sheet or plate of porous metal and permanently attaching it to the piece of stronger metal which serves as a support and reinforcement for the porous metal.

Further objects and advantages of the present invention will be apparent from the following description, reference being had to the accompanying drawings wherein a preferred embodiment of one form of the present invention is clearly shown.

Figure 4:
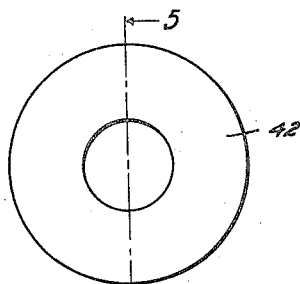
Figure 5:
Figure 6:
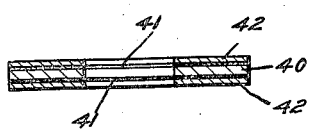

Figs. 4 and 5 are plan and sectional views on line 5—5 of Fig. 4, respectively, of a washer of porous metal; and Fig. 6 is a sectional view of a structure comprising two of the washers shown in Figs. 5 and 6 secured to opposite sides of a washer of stronger metal, said structure being adapted to be used as a thrust bearing.

Figure 1:
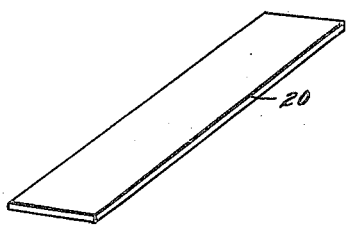
Fig. 1 is a perspective view of a plate of porous metal.
Figure 2:
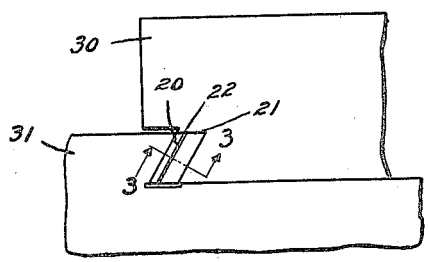
Fig. 2 is a fragmentary end view of two relatively slidable machine parts showing the application of a porous metal plate to a machine gib.
Figure 3:
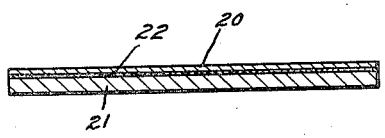
Fig. 3 is a fragmentary sectional view on line 3—3 of Fig. 2.

The plate 20, shown in Figs. 1 to 3, is constructed by briquetting a mixture of bronze forming metal powders, a filler such as graphite and a volatile void forming substance such as salicyclic acid, and then sintering this form under non-oxidizing conditions at a temperature and for a time sufficient to cause the metal particles to unite, and the void forming substance to volatilize and to produce a metal structure interspersed with a number of minute inter-communicating voids for receiving lubricant. Examples of the manufacture of porous metal are disclosed in the copending application of H. M. Williams, Serial No. 582,550 filed August 17, 1922.

The plate 20 is joined to a plate 21 of steel or other metal of high mechanical strength by first coating that side of the plate 21 which is to receive the plate 20 with a metal capable of alloying or bonding with both plates. Where the plate 20 is of porous bronze and the plate 21 of steel or iron, this coating may be of tin and is designated by numeral 22 in Figs. 2 and 3. While the porous metal plate 20 is held against the coating side of the plate 21 by suitable clamps not shown, this assembly is heated sufficiently to cause the tin to melt and alloy or otherwise unite or bond with both plates. Good results are obtained by heating the structure in a bath of salts having a melting temperature above the melting point of the tin or other bond.

After the assembly has been cooled the clamping means is removed and two plates will be found to be permanently joined. The plate 20 is impregnated with lubricant by immersing the structure in hot lubricating oil for a time, dependent upon the thickness of the plate 20.

Fig. 2 shows the use of this structure as a gib for relatively slidable machine elements 30 and 31.

Figs. 4, 5 and 6 show an application of this invention to the manufacture of thrust bearings. A washer 40 of steel or other strong metal is coated on both sides with a bonding metal 41 such as tin. A washer 42 of porous metal, made as stated with respect to the plate 20 is clamped against each side of the washer 40, and the entire assembly is heated in the manner described to cause the three washers to be permanently united. After the assembly is cooled the clamping means (not shown) is removed and the assembly is immersed in lubricant so that the washers 42 will be impregnated.

It is apparent that the present invention is susceptible of many applications, and is not limited alone to surfacing flat objects. As described and claimed specifically in my copending application Serial No. 188,930, filed May 5, 1927, bodies having cylindrical surfaces may be surfaced with porous metal.

While the form of embodiment of the present invention as herein disclosed, constitutes a preferred form, it is to be understood that other forms might be adopted, all coming within the scope of the claims which follow.

What is claimed is as follows:

1. A bearing element comprising a thin porous facing of metal having relatively slight tensile strength and having absorbed therein a considerable amount of lubricant, and a metal backing therefor co-extensive therewith and bonded thereto by an alloy bond throughout the area common to both facing and backing.

2. A bearing element comprising a thin porous metal facing and a metal backing therefor joined thereto by an alloy bond, said facing being impregnated with lubricant.

3. A machine element comprising a relatively thin plate having a porous metallic structure attached to a body of denser, stronger metal by an alloy bond.

4. A machine element comprising a thin plate of porous bronze attached to a body of ferrous metal by an alloy bond of copper and tin.

In testimony whereof I hereto affix my signature.

CHARLES R. SHORT.